March 8, 1932. L. G. FRANZEN 1,848,337
WINDSHIELD HEATER
Filed March 28, 1930
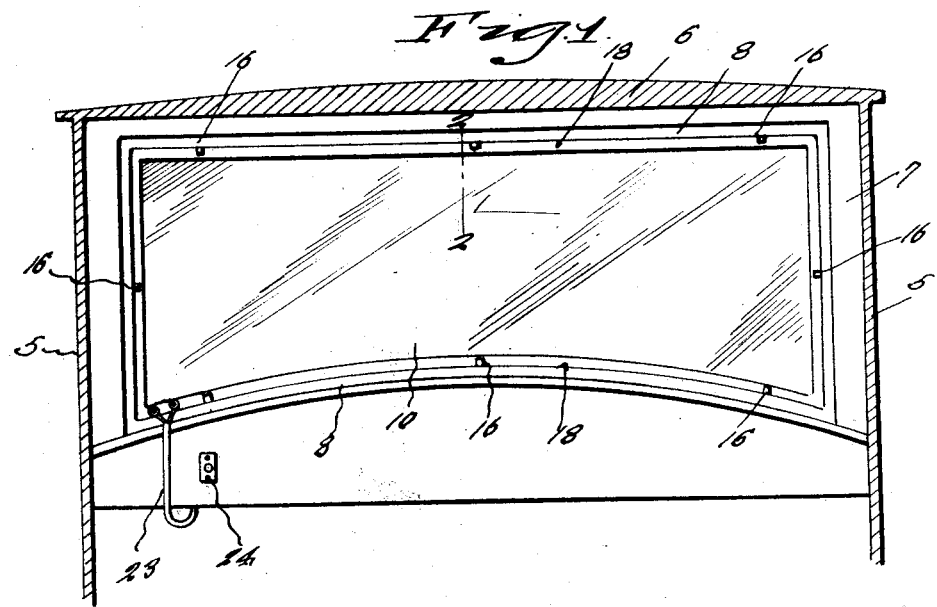
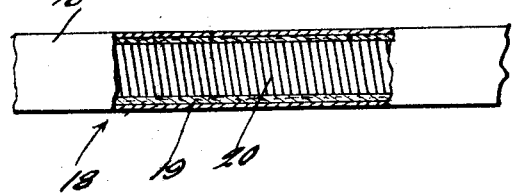
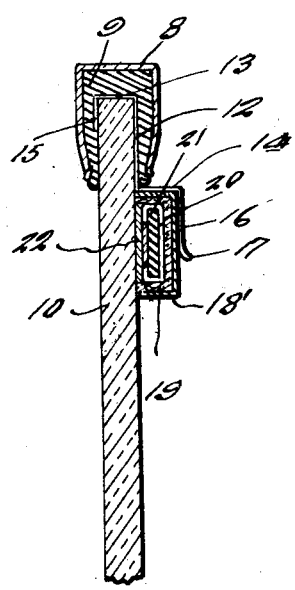
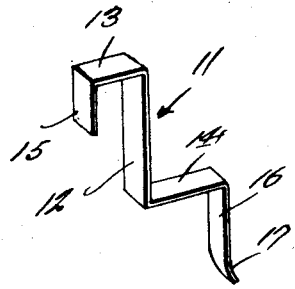
Inventor
Lillian G. Franzen
By Clarence A. O'Brien
Attorney Patented Mar. 8, 1932

1,848,337

UNITED STATES PATENT OFFICE

LILLIAN G. FRANZEN, OF AKRON, PENNSYLVANIA

WINDSHIELD HEATER

Application filed March 28, 1930. Serial No. 439,671.

This invention appertains to new and useful improvements in electrical heating, and more particularly to a novel attachment for automobile windshields.

The principal object of this invention is to provide an attachment for heating automobile windshields, in such a manner as not to obstruct the vision of the driver.

Another important object of the invention is to provide a heating attachment for automobile windshields, which is capable of being installed and removed with ease.

Other important objects and advantages of the invention will become more apparent to the reader after considering the invention as described and claimed hereinafter.

In the drawings:—

Figure 1 represents a vertical sectional view through the upper portion of an automobile, looking toward the windshield equipped with the novel heater.

Fig. 2 represents a fragmentary vertical sectional view taken substantially on the line 2—2 of Fig. 1.

Fig. 3 is an enlarged fragmentary sectional view of the heater.

Fig. 4 represents a perspective view of the clip for securing the heater to the windshield.

Referring to the drawings wherein like numerals designate like parts, it can be seen that numerals 5—5 represent the sides of an automobile body, while numeral 6 represents the top therefor. The usual wooden bar of the windshield frame is denoted by numeral 7, while the metallic windshield pane receiving portion is denoted by numeral 8.

This channel frame 8 receives the usual cushion body 9 into which engages the edge portion of the windshield pane 10.

As is clearly shown in Fig. 4, the novel heater employs a plurality of fastening elements, one of which is shown in Fig. 4 and denoted by numeral 11. This securing element is constructed of an elongated strip of spring metal, having an intermediate straight portion 12, a laterally bent portion 13 in one direction, and a laterally bent portion 14 at its opposite end, bent in the opposite direction.

The portion 13 is further bent downwardly as at 15 to engage the outside of the windshield, as in the manner shown in Fig. 2, while the lower laterally bent portion 14 is further bent downwardly as at 16 and outwardly at its extremity 17 to provide a spring clip for engaging the novel heater generally referred to by numeral 18 in the manner shown in Fig. 2.

The novel heater comprises a rectangular casing 18, of some suitable water-proof material. The casing is of U-shape in cross section, its side adjacent the windshield pane being open. A lining 19 of asbestos or some other suitable heat insulating material, lines the inner sides of the casing 18, leaving its open sides free.

As is clearly shown in Fig. 2, the heating element 20 is wound on a di-electric core 21 and is disposed within the confines of the asbestos lining 19. The open side of the casing is closed by a strip 22, of some suitable material through which heat may readily pass.

Obviously, the spring fastening 11 may be pulled away from the novel heater to permit displacement thereof from the windshield. The conductors 23 extend to the heating elements in substantially the manner shown in Fig. 1, while a switch 24 is employed for cutting on or off the heater circuit.

While the foregoing specification sets forth the invention in detail, it is to be understood that numerous changes in the shape, size and materials may be resorted to without departing from the spirit and scope of the invention as claimed hereinafter.

Having thus described my invention, what I claim as new is:—

A heater for windshields comprising a casing of channel shape in cross section extending around the edges of the transparent member of the windshield and abutting the frame of the windshield, a lining formed of conducting material in said member, a heating coil in the member, a strip of heat conductive material or the like closing the open part of said casing and contacting the transparent member of the windshield, and clips having hook-shaped parts passing over the edges of the transparent member, and spring parts for yieldingly and removably holding the device against the transparent member.

In testimony whereof I affix my signature.

LILLIAN G. FRANZEN.